United States Patent
Li et al.

(10) Patent No.: US 9,509,916 B2
(45) Date of Patent: Nov. 29, 2016

(54) IMAGE PRESENTATION METHOD AND APPARATUS, AND TERMINAL

(71) Applicant: Huawei Device Co., Ltd., Shenzhen (CN)

(72) Inventors: Changzhu Li, Shenzhen (CN); Mouzheng Fu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 26 days.

(21) Appl. No.: 14/585,625

(22) Filed: Dec. 30, 2014

(65) Prior Publication Data

US 2015/0109507 A1    Apr. 23, 2015

Related U.S. Application Data

(63) Continuation of application No. PCT/CN2014/071131, filed on Jan. 22, 2014.

(30) Foreign Application Priority Data

Jan. 22, 2013  (CN) .......................... 2013 1 0023362

(51) Int. Cl.
 *H04N 5/222* (2006.01)
 *H04N 5/225* (2006.01)
 *H04N 5/232* (2006.01)

(52) U.S. Cl.
 CPC ...... *H04N 5/23293* (2013.01); *H04N 5/23216* (2013.01)

(58) Field of Classification Search
 USPC ............. 348/333.01–333.12, 218.1; 396/264
 See application file for complete search history.

(56) References Cited

U.S. PATENT DOCUMENTS

| 2009/0041378 A1 | 2/2009 | Yamaoka et al. |
| 2009/0290046 A1 | 11/2009 | Kita |
| 2009/0295976 A1 | 12/2009 | Choi |

(Continued)

FOREIGN PATENT DOCUMENTS

| CN | 101662586 A | 3/2010 |
| CN | 102546925 A | 7/2012 |

(Continued)

OTHER PUBLICATIONS

Partial English Translation and Abstract of Japanese Patent Application No. 2007-121378, Jan. 29, 2016, 30 pages.

(Continued)

*Primary Examiner* — Aung S Moe
*Assistant Examiner* — Euel Cowan
(74) *Attorney, Agent, or Firm* — Conley Rose, P.C.

(57) ABSTRACT

A preview image presentation method and apparatus, and a terminal are provided. The method includes acquiring, by a terminal, an image captured by a camera; and presenting, on a screen of the terminal, a first preview image and a second preview image that are generated according to the image, where a size of the second preview image is less than a size of the first preview image. In the embodiments of the present invention, on an existing basis of displaying a first preview image in a full screen manner, a second preview image that is smaller than the first preview image may be presented additionally, so that a user can adjust photographic composition according to the second preview image, thereby enhancing a photography effect and improving user photography experience.

17 Claims, 6 Drawing Sheets

(56) References Cited

U.S. PATENT DOCUMENTS

| | | | |
|---|---|---|---|
| 2010/0053212 A1* | 3/2010 | Kang | H04N 21/23412 345/629 |
| 2012/0008011 A1* | 1/2012 | Garcia Manchado | G03B 15/08 348/231.2 |
| 2012/0133645 A1* | 5/2012 | Jung | H04N 13/0011 345/419 |
| 2012/0172086 A1 | 7/2012 | Choi et al. | |
| 2012/0274808 A1 | 11/2012 | Chong et al. | |
| 2012/0307112 A1 | 12/2012 | Kunishige et al. | |
| 2013/0182062 A1* | 7/2013 | Son | H04N 7/144 348/14.07 |
| 2013/0321340 A1 | 12/2013 | Seo et al. | |
| 2014/0118600 A1 | 5/2014 | Son et al. | |

FOREIGN PATENT DOCUMENTS

| | | | | |
|---|---|---|---|---|
| CN | 103049175 | A | | 4/2013 |
| CN | 103795913 | A | | 5/2014 |
| EP | 2207342 | A2 | | 7/2010 |
| EP | 2728853 | A2 | | 5/2014 |
| GB | EP728853 | A2 | * 7/2014 | H04N 5/335 |
| JP | 2007121378 | A | | 5/2007 |
| JP | 2008311943 | A | | 12/2008 |
| JP | 20090175935 | A | | 8/2009 |
| JP | 2009284309 | A | | 12/2009 |
| JP | 2010213216 | A | | 9/2010 |
| JP | 2011118586 | A | | 6/2011 |
| JP | 2012253448 | A | | 12/2012 |
| WO | 2007055336 | A1 | | 5/2007 |
| WO | 2012108668 | A2 | | 8/2012 |

OTHER PUBLICATIONS

Partial English Translation and Abstract of Japanese Patent Application No. 2008-311943, Feb. 1, 2016, 56 pages.
Partial English Translation and Abstract of Japanese Patent Application No. 2009-284309, Jan. 29, 2016, 54 pages.
Partial English Translation and Abstract of Japanese Patent Application No. 2010-213216, Jan. 29, 2016, 46 pages.
Partial English Translation and Abstract of Japanese Patent Application No. 2011-118586, Jan. 29, 2016, 39 pages.
Foreign Communication From a Counterpart Application, Japanese Application No. 2015-523413, Japanese Office Action dated Dec. 1, 2015, 3 pages.
Foreign Communication From a Counterpart Application, Japanese Application No. 2015-523413, English Translation of Japanese Office Action dated Dec. 1, 2015, 4 pages.
Foreign Communication From a Counterpart Application, European Application No. 14743773.5 Extended European Search Report dated Jul. 23, 2015, 11 pages.
Partial English Translation and Abstract of Chinese Patent Application No. CN103049175A, Feb. 3, 2015, 2 pages.
Foreign Communication From a Counterpart Application, Chinese Application No. 201310023362.8, Chinese Office Action dated Dec. 3, 2014, 7 pages.
Foreign Communication From a Counterpart Application, PCT Application No. PCT/CN2014/071131, English Translation of International Search Report dated Apr. 23, 2014, 2 pages.
Foreign Communication From a Counterpart Application, PCT Application No. PCT/CN2014/071131, Written Opinion dated Apr. 23, 2014, 5 pages.
Foreign Communication From a Counterpart Application, Chinese Application No. 201310023362.8, Chinese Office Action dated Feb. 14, 2016, 7 pages.
Partial English Translation and Abstract of Japanese Patent Application No. JPA2012-253448, Sep. 23, 2016, 95 pages.
Foreign Communication From A Counterpart Application, Japanese Application No. 2015-523413, Japanese Office Action dated Sep. 6, 2016, 4 pages.
Foreign Communication From A Counterpart Application, Japanese Application No. 2015-523413, English Translation of Japanese Office Action dated Sep. 6, 2016, 5 pages.

* cited by examiner

IMAGE PRESENTATION METHOD AND APPARATUS, AND TERMINAL

CROSS-REFERENCE TO RELATED APPLICATIONS

This application is a continuation of International Application No. PCT/CN2014/071131, filed on Jan. 22, 2014, which claims priority to Chinese Patent Application No. 201310023362.8, filed on Jan. 22, 2013, both of which are hereby incorporated by reference in their entireties.

TECHNICAL FIELD

The present invention relates to the field of intelligent terminal technologies, and in particular, to a preview image presentation method and apparatus, and a terminal.

BACKGROUND

In the prior art, intelligent terminals have been applied widely. Generally, one front-facing camera and one rear-facing camera may be disposed on an intelligent terminal. In a common state, the front-facing camera faces a user holding the intelligent terminal, and may implement image presentation when the user is making a video call or taking a selfie. That the user takes a selfie is used as an example. The intelligent terminal may display a preview image in real time on a screen according to an output of the front-facing camera. The user may adjust, according to the preview image, image composition, on the screen, of an image that is captured by the front-facing camera, and when obtaining satisfactory image composition by means of adjustment, the user taps a camera button to complete the selfie.

In a process of researching the prior art, the inventor finds that an intelligent terminal generally displays a preview image in a full screen manner; when observing the preview image, a user generally watches the center of the image; and in this case, eyes of the user in the preview image are difficult to focus because a sight line of the user diverges from a front-facing camera. In addition, if watching the front-facing camera, the user can observe the preview image only by using a peripheral vision, and it is difficult to capture an expression change. It may be learned from this that when an intelligent terminal performs preview displaying on an image captured by a front-facing camera, a photography effect is poor because the displaying can be performed only in a full screen manner, thereby causing poor user photography experience.

SUMMARY

Embodiments of the present invention provide a preview image presentation method and apparatus, and a terminal, so as to resolve a problem in the prior art of a poor photography effect and poor user photography experience that are caused by displaying a preview image in a full screen manner.

To resolve the foregoing technical problem, the embodiments of the present invention disclose the following technical solutions.

According to a first aspect, a preview image presentation method is provided, where the method includes acquiring, by a terminal, an image captured by a camera; and presenting, on a screen of the terminal, a first preview image and a second preview image that are generated according to the image, where a size of the second preview image is less than a size of the first preview image.

With reference to the first aspect, in a first possible implementation manner of the first aspect, the presenting, on a screen of the terminal, a first preview image and a second preview image that are generated according to the image includes presenting, in a display area of the screen, the first preview image generated according to the image; generating the second preview image according to the first preview image by using a downscale algorithm; and presenting the second preview image on a preset location in the display area.

With reference to the first possible implementation manner of the first aspect, in a second possible implementation manner of the first aspect, the presenting the second preview image on a preset location in the display area includes presenting the second preview image by superimposing the second preview image on a preset location of the first preview image; or presenting the second preview image on a preset location that is independent of the first preview image.

With reference to the first possible implementation manner of the first aspect, or the second possible implementation manner of the first aspect, in a third possible implementation manner of the first aspect, the preset location includes a location that is located in a same vertical direction as the camera and is spaced from the camera by a distance less than a threshold; or a location that is in a direction having a preset included angle with respect to a vertical direction of the camera and is spaced from the camera by a distance less than a threshold.

With reference to the first aspect, the first possible implementation manner of the first aspect, the second possible implementation manner of the first aspect, or the third possible implementation manner of the first aspect, in a fourth possible implementation manner of the first aspect, the method further includes receiving an operating instruction of a user on the second preview image; and presenting the second preview image on a target location indicated by the operating instruction.

According to a second aspect, a preview image presentation apparatus is provided, where the apparatus includes an acquiring unit configured to acquire an image captured by a camera; and a presentation unit configured to present, on a screen of a terminal, a first preview image and a second preview image that are generated according to the image acquired by the acquiring unit, where a size of the second preview image is less than a size of the first preview image.

With reference to the second aspect, in a first possible implementation manner of the second aspect, the presentation unit includes a first presentation subunit configured to present, in a display area of the screen, the first preview image generated according to the image; and a second presentation subunit configured to generate the second preview image according to the first preview image by using a downscale algorithm, and present the second preview image on a preset location in the display area.

With reference to the first possible implementation manner of the second aspect, in a second possible implementation manner of the second aspect, the second presentation subunit is configured to present the second preview image by superimposing the second preview image on a preset location of the first preview image, or present the second preview image on a preset location that is independent of the first preview image.

With reference to the second aspect, the first possible implementation manner of the second aspect, or the second possible implementation manner of the second aspect, in a third possible implementation manner of the second aspect, the apparatus further includes a receiving unit configured to receive an operating instruction of a user on the second preview image, where the presentation unit is further configured to present the second preview image on a target location indicated by the operating instruction received by the receiving unit.

According to a third aspect, a terminal is provided, where the terminal includes a processor, and a camera and a screen that are connected to the processor, where the camera is configured to capture an image, and transfer the image to the processor; and the processor is configured to present, on the screen, a first preview image and a second preview image that are generated according to the image, where a size of the second preview image is less than a size of the first preview image.

With reference to the third aspect, in a first possible implementation manner of the third aspect, the processor is configured to present, in a display area of the screen, the first preview image generated according to the image, generate the second preview image according to the first preview image by using a downscale algorithm, and present the second preview image on a preset location in the display area.

With reference to the first possible implementation manner of the third aspect, in a second possible implementation manner of the third aspect, the processor is configured to present the second preview image by superimposing the second preview image on a preset location of the first preview image, or present the second preview image on a preset location that is independent of the first preview image.

With reference to the third aspect, the first possible implementation manner of the third aspect, or the second possible implementation manner of the third aspect, in a third possible implementation manner of the third aspect, the processor is further configured to receive an operating instruction of a user on the second preview image, and present the second preview image on a target location indicated by the operating instruction.

In embodiments of the present invention, a terminal acquires an image captured by a camera, and presents, on a screen of the terminal, a first preview image and a second preview image that are generated according to the image, where a size of the second preview image is less than a size of the first preview image. In the embodiments of the present invention, on an existing basis of displaying a first preview image in a full screen manner, a second preview image that is smaller than the first preview image may be presented additionally, so that a user can adjust photographic composition according to the second preview image, thereby enhancing a photography effect and improving user photography experience.

BRIEF DESCRIPTION OF THE DRAWINGS

To describe the technical solutions in the embodiments of the present invention more clearly, the following briefly introduces the accompanying drawings required for describing the embodiments or the prior art. A person of ordinary skill in the art may still derive other drawings from these accompanying drawings without creative efforts.

DETAILED DESCRIPTION

The following embodiments of the present invention provide a preview image presentation method and apparatus, and a terminal.

To enable a person skilled in the art to better understand technical solutions in the embodiments of the present invention and to make the foregoing objectives, features, and advantages of the embodiments of the present invention more obvious and comprehensible, the following further describes the technical solutions in the embodiments of the present invention in detail with reference to the accompanying drawings.

Figure 1:
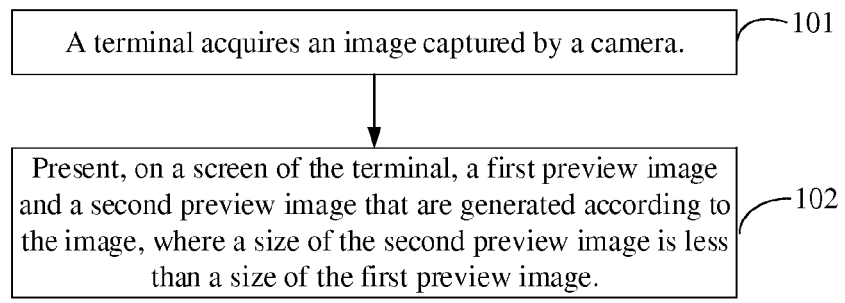
FIG. 1 is a flowchart of an embodiment of a preview image presentation method according to the present invention.

Referring to FIG. 1, FIG. 1 is a flowchart of an embodiment of a preview image presentation method according to the present invention.

Step 101: A terminal acquires an image captured by a camera.

The terminal in this embodiment may be an intelligent terminal into which a camera and a touchscreen are integrated, for example, a smart phone, a personal digital assistant (PDA), a personal access device (PAD), and a photographic camera. The camera may refer to a front-facing camera with a selfie function, and correspondingly, a preview image presented in this embodiment of the present invention may refer to an image captured by the front-facing camera.

Step 102: Present, on a screen of the terminal, a first preview image and a second preview image that are generated according to the image, where a size of the second preview image is less than a size of the first preview image.

The first preview image generated according to the image captured by the camera may be presented in a display area of the screen; the second preview image may be generated according to the first preview image by using a downscale algorithm; and the second preview image may be presented on a preset location in the display area. In this embodiment, the size of the second preview image is less than the size of the first preview image. Optionally, the second preview image may be presented by superimposing the second preview image on a preset location of the first preview image; or the second preview image may be presented on a preset location that is independent of the first preview image.

It may be learned from the foregoing embodiment that in this embodiment, on an existing basis of displaying a first preview image in a full screen manner, a second preview image that is smaller than the first preview image may be presented additionally, so that a user can adjust photographic composition according to the second preview image, thereby enhancing a photography effect and improving user photography experience.

Figure 2:
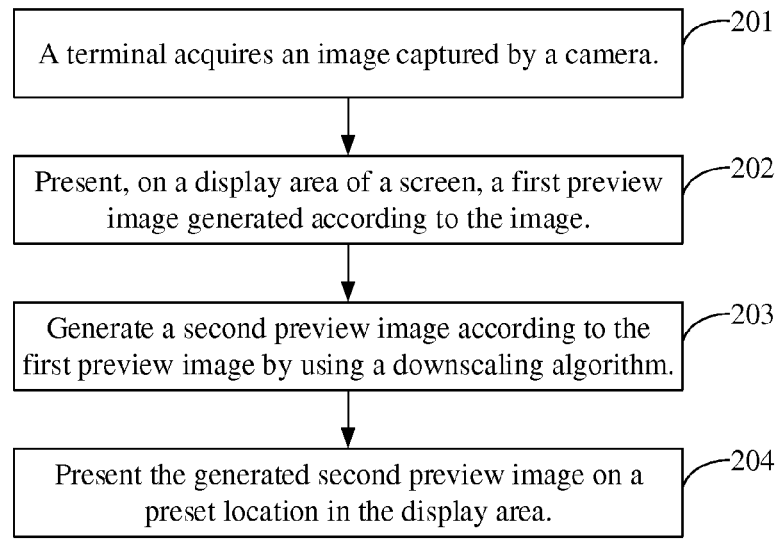
FIG. 2 is a flowchart of another embodiment of a preview image presentation method according to the present invention.

Referring to FIG. 2, FIG. 2 is a flowchart of another embodiment of a preview image presentation method according to the present invention.

Step 201: A terminal acquires an image captured by a camera.

The terminal in this embodiment may be an intelligent terminal into which a camera and a touchscreen are integrated, for example, a smart phone, a PDA, a palmtop computer PAD, and a photographic camera. The camera may refer to a front-facing camera with a selfie function, and correspondingly, a preview image presented in this embodiment of the present invention may refer to an image captured by the front-facing camera.

Step 202: Present, in a display area of a screen, a first preview image generated according to the image.

In this embodiment, a presentation manner of the first preview image is the same as that in the prior art. Generally, the first preview image may be presented in the display area of the screen in a full screen manner, which is not described herein again.

Step 203: Generate a second preview image according to the first preview image by using a downscale algorithm.

In this embodiment, a size of the second preview image is less than a size of the first preview image. The second preview image may be generated by using various existing downscaling algorithms, for example, with the first preview image used as an input, a second preview image that is one fourth the size of the first preview image is generated. A specific size of the second preview image is not limited in this embodiment.

Step 204: Present the generated second preview image on a preset location in the display area.

In this embodiment, the second preview image may be presented by superimposing the second preview image on a preset location of the first preview image; or, the display area may be divided into two parts, where the larger part is used to present the first preview image and the smaller part is used to present the second preview image, that is, the second preview image may be presented on a preset location that is independent of the first preview image.

In this embodiment, the preset location may include a location near the camera, for example, a location that is located in a same vertical direction as the camera and is spaced from the camera by a distance less than a threshold; or a location having a certain angle with respect to the camera, for example, a location that is in a direction having a preset included angle with respect to a vertical direction of the camera and is spaced from the camera by a distance less than a threshold.

It may be learned from the foregoing embodiment that in this embodiment, on an existing basis of displaying a first preview image in a full screen manner, a second preview image that is smaller than the first preview image may be presented additionally, so that a user can adjust photographic composition according to the second preview image, thereby enhancing a photography effect and improving user photography experience. For example, when the second preview image is presented near a camera, the user may enable a sight line to exactly face the camera when watching the second preview image, thereby improving the photography effect.

Figure 3:
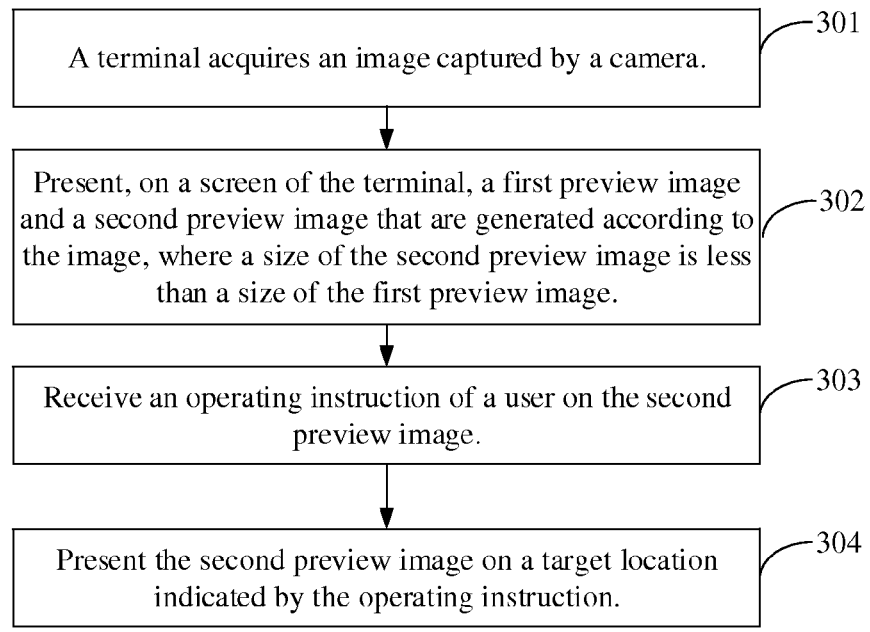
FIG. 3 is a flowchart of another embodiment of a preview image presentation method according to the present invention.

Referring to FIG. 3, FIG. 3 is a flowchart of another embodiment of a preview image presentation method according to the present invention.

Step 301: A terminal acquires an image captured by a camera.

The terminal in this embodiment may be an intelligent terminal into which a camera and a touchscreen are integrated, for example, a smart phone, a PDA, a palmtop computer PAD, and a photographic camera. The camera may refer to a front-facing camera with a selfie function, and correspondingly, a preview image presented in this embodiment of the present invention may refer to an image captured by the front-facing camera.

Step 302: Present, on a screen of the terminal, a first preview image and a second preview image that are generated according to the image, where a size of the second preview image is less than a size of the first preview image.

The first preview image generated according to the image captured by the camera may be presented in a display area of the screen; the second preview image may be generated according to the first preview image by using a downscaling algorithm; and the second preview image may be presented on a preset location in the display area. In this embodiment, the size of the second preview image is less than the size of the first preview image. Optionally, the second preview image may be presented by superimposing the second preview image on a preset location of the first preview image; or the second preview image may be presented on a preset location that is independent of the first preview image.

Step 303: Receive an operating instruction of a user on the second preview image.

A difference from the embodiment of FIG. 2 lies in that in this embodiment, after the second preview image is presented on the screen according to step 302, the user may move, according to a photography requirement, the second preview image on the screen by using the operating instruction. The terminal may provide preset location options for the user to select, and a select action of the user for a location generates a corresponding operating instruction; or, for a touchscreen, the user may drag the second preview image on the screen, and a corresponding operating instruction is generated by using a drag gesture.

Step 304: Present the second preview image on a target location indicated by the operating instruction.

According to different operating instruction types, when the operating instruction is an operating instruction generated according to the select action of the user for a location, after the user ends the selection, the second preview image is presented on a selected target location according to the operating instruction; when the operating instruction is an operating instruction generated according to the drag gesture, after the user ends the dragging, the second preview image is presented, according to the operating instruction generated by the drag gesture, on a target location at which a finger leaves the screen.

It may be learned from the foregoing embodiment that in this embodiment, on an existing basis of displaying a first preview image in a full screen manner, a second preview image that is smaller than the first preview image may be presented additionally, so that a user can adjust photographic composition according to the second preview image, thereby enhancing a photography effect and improving user photography experience. In addition, the user can move the second preview image, so that flexible image composition may be performed according to a photography requirement of the user, which further improves the user photography experience. For example, when the second preview image is presented near a camera, the user may enable a sight line to exactly face the camera when watching the second preview image, thereby improving the photography effect. For another example, when the user wants to capture a side view, the second preview image may be dragged to a location in a direction having a preset included angle with respect to a vertical direction of the camera, so as to perform the image composition based on the second preview image.

The following describes a preview image presentation result of the present invention with reference to several presentation instances.

Figure 4A:
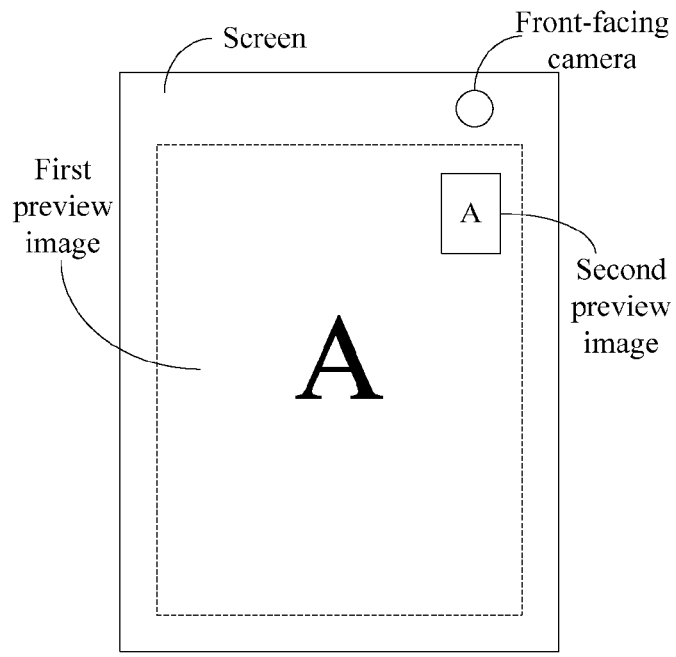
FIG. 4A is a schematic diagram of presenting a preview image according to a method embodiment of the present invention.

Referring to FIG. 4A, FIG. 4A is a schematic diagram of presenting a preview image by applying a method embodiment of the present invention. A front-facing camera is disposed on the upper right of a screen, a first preview image is presented on a display area in a full screen manner, a second preview image is superimposed on the first preview image, and the second preview image is presented below the front-facing camera. Because the second preview image is located near the front-facing camera, when a user is watching the second preview image, a presented image is an image in which the user is watching the camera.

Figure 4B:
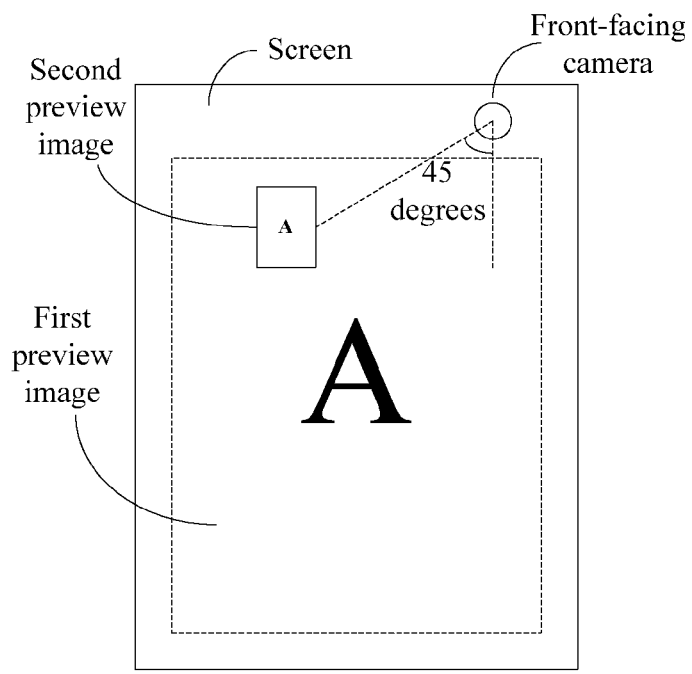
FIG. 4B is another schematic diagram of presenting a preview image according to a method embodiment of the present invention.

Referring to FIG. 4B, FIG. 4B is another schematic diagram of presenting a preview image by applying a method embodiment of the present invention. A front-facing camera is disposed on the upper right of a screen, a first preview image is presented on a display area in a full screen manner, a second preview image is superimposed on the first preview image, and the second preview image has a 45-degree included angle with respect to a vertical direction of the front-facing camera. In this case, when a user is watching the second preview image, a photography effect of a side view of the user may be presented. It should be noted that FIG. 4B is not intended to limit an included angle between the second preview image and the vertical direction of the front-facing camera to 45 degrees. Any angle is acceptable as long as it can ensure that a photography effect of a side view of a user can be previewed when the user is watching the second preview image.

Figure 4C:
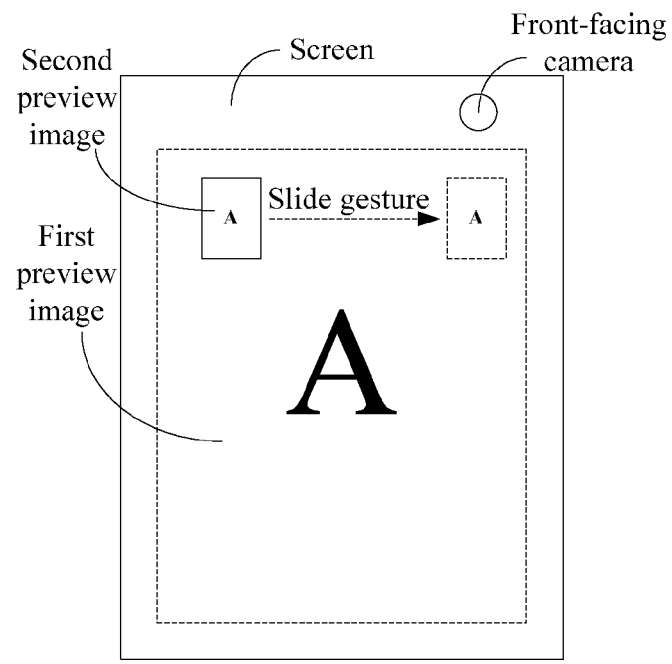
FIG. 4C is another schematic diagram of presenting a preview image according to a method embodiment of the present invention.

Referring to FIG. 4C, FIG. 4C is another schematic diagram of presenting a preview image by applying a method embodiment of the present invention. Based on FIG. 4B, the user may drag the second preview image by using a gesture, and drag the second preview image from the location having a 45-degree included angle with respect to the vertical direction of the front-facing camera to a location below the front-facing camera. Therefore, a photographing angle of the front-facing camera may be adjusted from a side view of the user to a front view of the user, and a presented image is an image in which the user is watching the camera.

Figure 4D:
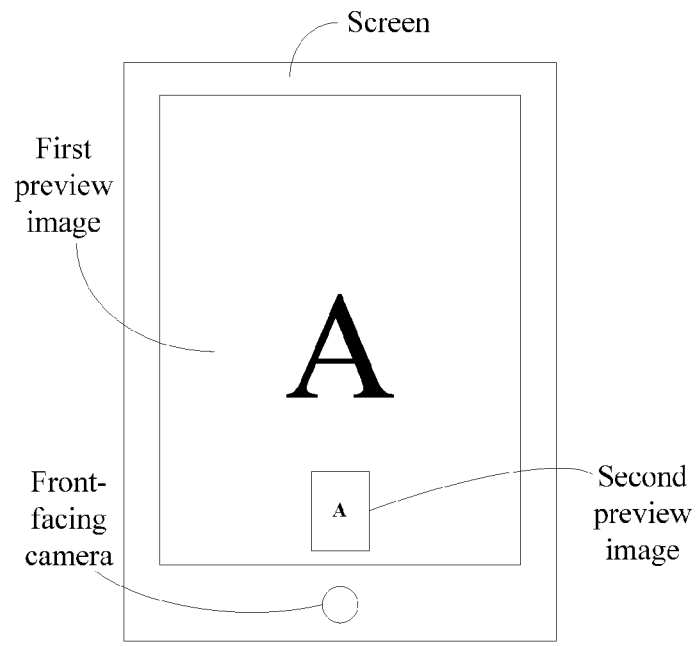
FIG. 4D is another schematic diagram of presenting a preview image according to a method embodiment of the present invention.

Referring to FIG. 4D, FIG. 4D is another schematic diagram of presenting a preview image according to a method embodiment of the present invention. A difference from FIG. 4A lies in that a front-facing camera is disposed on a central location below a screen, a first preview image is presented on a display area in a full screen manner, a second preview image is superimposed on the first preview image, and the second preview image is presented above the front-facing camera.

Figure 4E:
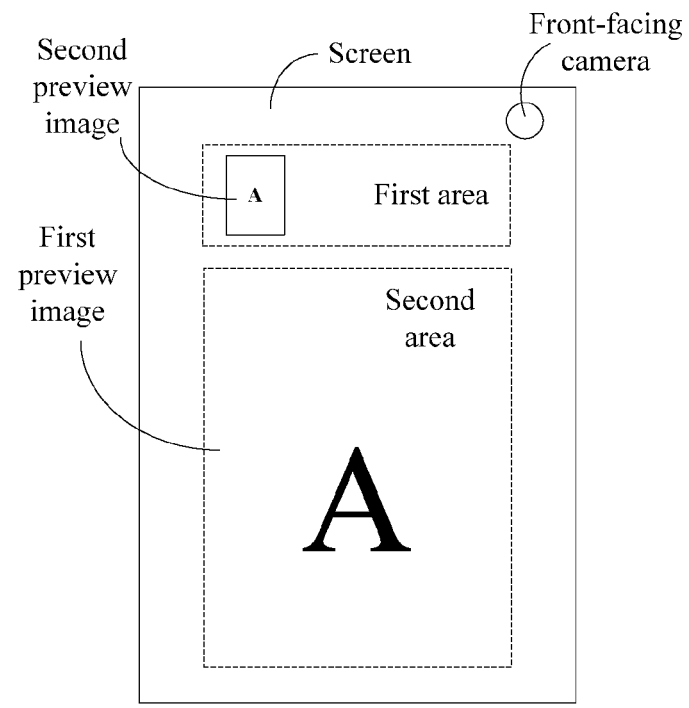
FIG. 4E is another schematic diagram of presenting a preview image according to a method embodiment of the present invention.

Referring to FIG. 4E, FIG. 4E is another schematic diagram of presenting a preview image by applying a method embodiment of the present invention. A difference from FIG. 4B lies in that a display area of a screen is divided into two parts, where the larger first area in the lower part of the screen is used to present a first preview image in a full screen manner, a second area above the first area is used to present a second preview image, and the second preview image may be presented on any location in the second area. Certainly, the second preview image may also be presented by superimposing the second preview image on the first preview image, which is not limited in the embodiment.

Corresponding to embodiments of a preview image presentation method of the present invention, the present invention further provides embodiments of a preview image presentation apparatus and a terminal.

Figure 5:
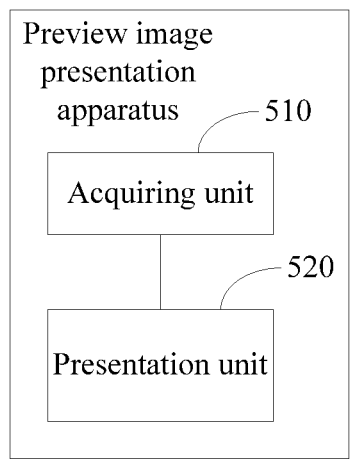
FIG. 5 is a block diagram of an embodiment of a preview image presentation apparatus according to the present invention.

Referring to FIG. 5, FIG. 5 is a block diagram of an embodiment of a preview image presentation apparatus according to the present invention.

The apparatus includes an acquiring unit 510 and a presentation unit 520.

The acquiring unit 510 is configured to acquire an image captured by a camera.

The presentation unit 520 is configured to present, on a screen of a terminal, a first preview image and a second preview image that are generated according to the image acquired by the acquiring unit 510, where a size of the second preview image is less than a size of the first preview image.

Optionally, the presentation unit 520 may include (not shown in FIG. 5) a first presentation subunit configured to present, in a display area of the screen, the first preview image generated according to the image; and a second presentation subunit configured to generate the second preview image according to the first preview image by using a downscale algorithm, and present the second preview image on a preset location in the display area.

The second presentation subunit may be configured to present the second preview image by superimposing the second preview image on a preset location of the first preview image, or present the second preview image on a preset location that is independent of the first preview image.

Figure 6:
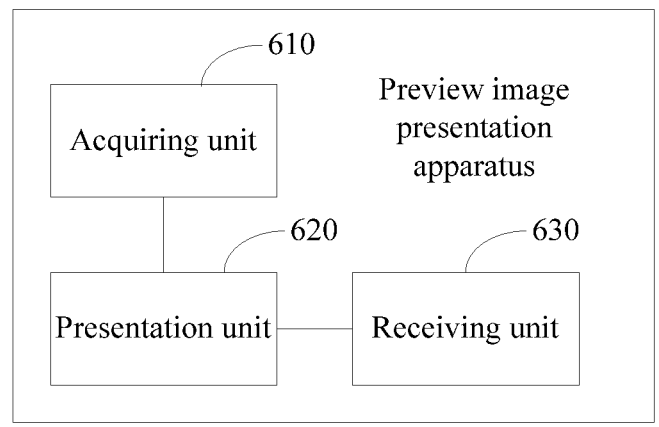
FIG. 6 is a block diagram of another embodiment of a preview image presentation apparatus according to the present invention.

Referring to FIG. 6, FIG. 6 is a block diagram of another embodiment of a preview image presentation apparatus according to the present invention.

The apparatus includes an acquiring unit 610, a presentation unit 620, and a receiving unit 630.

The acquiring unit 610 is configured to acquire an image captured by a camera.

The presentation unit 620 is configured to present, on a screen of a terminal, a first preview image and a second preview image that are generated according to the image acquired by the acquiring unit 610, where a size of the second preview image is less than a size of the first preview image.

The receiving unit 630 is configured to receive an operating instruction of a user on the second preview image.

The presentation unit 620 is further configured to present the second preview image on a target location indicated by the operating instruction received by the receiving unit 630.

Optionally, the presentation unit 620 may include (not shown in FIG. 6) a first presentation subunit configured to present, in a display area of the screen, the first preview image generated according to the image; and a second presentation subunit configured to generate the second preview image according to the first preview image by using a downscale algorithm, and present the second preview image on a preset location in the display area.

The second presentation subunit may be configured to present the second preview image by superimposing the second preview image on a preset location of the first preview image, or present the second preview image on a preset location that is independent of the first preview image.

Figure 7:
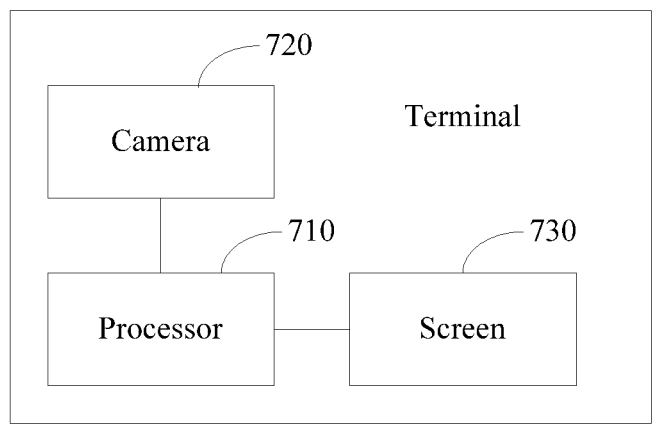
FIG. 7 is a block diagram of an embodiment of a terminal according to the present invention.

Referring to FIG. 7, FIG. 7 is a block diagram of an embodiment of a terminal according to the present invention.

The terminal includes a processor 710, and a camera 720 and a screen 730 that are connected to the processor 710.

The camera 720 is configured to capture an image, and transfer the image to the processor 710.

The processor 710 is configured to present, on the screen 730, a first preview image and a second preview image that are generated according to the image, where a size of the second preview image is less than a size of the first preview image.

Optionally, the processor 710 may be configured to present, in a display area of the screen 730, the first preview image generated according to the image, generate the second preview image according to the first preview image by using a downscale algorithm, and present the second preview image on a preset location in the display area.

Optionally, the processor 710 may be configured to present the second preview image by superimposing the second preview image on a preset location of the first preview image, or present the second preview image on a preset location that is independent of the first preview image.

Optionally, the processor 710 may be further configured to receive an operating instruction of a user on the second preview image, and present the second preview image on a target location indicated by the operating instruction.

It may be learned from the foregoing embodiments that a terminal acquires an image captured by a camera, and presents, on a screen of the terminal, a first preview image and a second preview image that are generated according to the image, where a size of the second preview image is less than a size of the first preview image. In the embodiments of the present invention, on an existing basis of displaying a first preview image in a full screen manner, a second preview image that is smaller than the first preview image may be presented additionally, so that a user can adjust photographic composition according to the second preview image, thereby enhancing a photography effect and improving user photography experience.

A person skilled in the art may clearly understand that the technology in the embodiments of the present invention may be implemented by software in addition to a necessary universal hardware platform. Based on such an understanding, the technical solutions of the embodiments of the present invention essentially or the part contributing to the prior art may be implemented in a form of a software product. The computer software product may be stored in a storage medium, such as a read-only memory (ROM)/ random-access memory (RAM), a magnetic disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner. The same or similar parts in the embodiments can be referenced mutually. The focus of each embodiment is placed on a difference from other embodiments. In particular, an apparatus embodiment is described relatively simply because it is basically similar to a method embodiment, and for a related part, reference may be made to a part of description of the method embodiments.

The embodiments of the present invention described above are not intended to limit the protection scope of the present invention. Any modification, equivalent replacement, and improvement made without departing from the spirit and principle of the present invention shall fall within the protection scope of the present invention.

What is claimed is:

1. A preview image presentation method by a terminal having a front camera, a rear camera and a screen, comprising:
    acquiring, by the terminal, an image captured by the front camera, wherein the front camera is disposed at a same side of the terminal as the screen:
    presenting, in a display area of the screen, a first preview image generated according to the image; and
    generating a second preview image according to the image; by using a downscale algorithm; and
    presenting the second preview image on a preset location in the display area, wherein the preset location is proximate to the front camera starting at a 45 degree angle with respect to a vertical line passing through the center of the viewing direction of the front-facing camera, and a size of the second preview image is less than a size of the first preview image, and adjusting a photographic composition according to the second preview image to enable enhancing a photography effect.

2. The method according to claim 1, wherein presenting the second preview image on the preset location in the display area comprises presenting the second preview image by superimposing the second preview image on the first preview image.

3. The method according to claim 1, wherein presenting the second preview image on the preset location in the display area comprises presenting the second preview image on the preset location that is independent of the first preview image.

4. The method according to claim 1, wherein the preset location comprises:
    a location that is located in a same vertical direction as the front camera and is spaced from the front camera by a distance less than a threshold; or
    a location that is in a direction having a preset angle with respect to a vertical direction of the front camera and is spaced from the front camera by a distance less than a threshold.

5. The method according to claim 2, wherein the preset location comprises:
    a location that is located in a same vertical direction as the front camera and is spaced from the front camera by a distance less than a threshold; or
    a location that is in a direction having a preset angle with respect to a vertical direction of the front camera and is spaced from the front camera by a distance less than a threshold.

6. The method according to claim 1, further comprising:
    receiving an operating instruction of a user on the second preview image; and
    presenting the second preview image on a target location indicated by the operating instruction.

7. A preview image presentation apparatus, comprising: a memory: and
    a processor coupled to the memory and configured to:
    acquire an image captured by a front camera,
    wherein the front camera is disposed at a same side of the apparatus as a screen: present, in a display area of the screen, a first preview image generated according to the image;

generating a second preview image according to the image by using a downscale algorithm; and presenting the second preview image on a preset location in the display area, and wherein the preset location is proximate to the front camera starting at a 45 degree angle with respect to a vertical line passing through the center of the viewing direction of the front-facing camera, and a size of the second preview image is less than a size of the first preview image.

8. The apparatus according to claim 7, wherein the processor is configured to present the second preview image by superimposing the second preview image on the first preview image.

9. The apparatus according to claim 7, wherein the processor is configured to present the second preview image on the preset location that is independent of the first preview image.

10. The apparatus according to claim 7, wherein the preset location comprises:
 a location that is located in a same vertical direction as the front camera and is spaced from the front camera by a distance less than a threshold; or
 a location that is in a direction having a preset angle with respect to a vertical direction of the front camera and is spaced from the front camera by a distance less than a threshold.

11. The apparatus according to claim 8, wherein the preset location comprises:
 a location that is located in a same vertical direction as the front camera and is spaced from the front camera by a distance less than a threshold; or
 a location that is in a direction having a preset angle with respect to a vertical direction of the front camera and is spaced from the front camera by a distance less than a threshold.

12. The apparatus according to claim 7, wherein the apparatus further comprises a receiver coupled to the processor and configured to receive an operating instruction of a user on the second preview image, and wherein the processor is further configured to present the second preview image on a target location indicated by the operating instruction received by the receiver.

13. A terminal, comprising: a processor; and
 a front camera, a rear camera and a screen that are connected to the processor, wherein the front camera disposed at a same side of the terminal as the screen,
 wherein the front camera is configured to capture an image, and
 wherein the processor is configured to present, in a display area of the screen, a first preview image generated according to the image; generate a second preview image according to the image by using a downscale algorithm; and
 present the second preview image on a preset location in the display area, wherein the preset location is proximate to the front camera starting at a 45 degree angle with respect to a vertical line passing through the center of the viewing direction of the front-facing camera, and a size of the second preview image is less than a size of the first preview image.

14. The terminal according to claim 13, wherein the processor is configured to present the second preview image by superimposing the second preview image on the first preview image.

15. The terminal according to claim 13, wherein the processor is configured to present the second preview image on the preset location that is independent of the first preview image.

16. The terminal according to claim 14, wherein the preset location comprises:
 a location that is located in a same vertical direction as the front camera and is spaced from the front camera by a distance less than a threshold; or
 a location that is in a direction having a preset angle with respect to a vertical direction of the front camera and is spaced from the front camera by a distance less than a threshold.

17. The terminal according to claim 13, wherein the processor is further configured to receive an operating instruction of a user on the second preview image, and present the second preview image on a target location indicated by the operating instruction.

* * * * *